United States Patent [19]
Camilleri et al.

[11] 3,718,622
[45] Feb. 27, 1973

[54] GEL PREVENTION IN POLYURETHANES

[75] Inventors: Louis T. Camilleri, North Bellmore; Manfred H. Huebner, Lindenhurst, both of N.Y.

[73] Assignee: Hooker Chemical Corporation, Niagara Falls, N.Y.

[22] Filed: Dec. 31, 1970

[21] Appl. No.: 103,282

[52] U.S. Cl..................260/75 NP, 260/77.5 MA, 260/77.5 AN, 260/859
[51] Int. Cl.........................C08g 22/16, C08g 41/04
[58] Field of Search............260/77.5 AN, 77.5 MA 77.5 SS, 260/77.5 TB, 77.5 SP

[56] References Cited

UNITED STATES PATENTS

| | | | |
|---|---|---|---|
| 3,102,875 | 9/1963 | Heiss | 260/77.5 |
| 2,970,123 | 1/1961 | Rhodes et al. | 260/22 |
| 3,317,463 | 5/1967 | Schonfeld et al. | 260/47 |
| 3,012,993 | 12/1961 | Rogan | 260/77.5 |
| 3,384,623 | 5/1968 | Inouye | 260/75 |

*Primary Examiner*—Donald E. Czaja
*Assistant Examiner*—H. S. Cockeram
*Attorney*—Peter F. Casella, Donald C. Studley, Richard P. Mueller and James F. Mudd

[57] ABSTRACT

The formation of gel particles in bulk polymerized thermoplastic polyurethanes is greatly reduced by employing a high molecular weight monofunctional compound having a hydroxyl group in the reaction mixture of an organic compound containing groups reactive with isocyanato groups and an organic polyisocyanate. The polyurethanes can be employed in applications such as the preparation of films, sheets, pipe, and coatings, either alone or in blends with other plastics such as polyvinylchloride, and the like.

9 Claims, No Drawings

GEL PREVENTION IN POLYURETHANES

BACKGROUND OF THE INVENTION

Bulk polymerized thermoplastic polyurethanes frequently contain gel particles which are believed to be cross-linked or ultra high molecular weight polyurethane particles produced by side reactions of the unreacted isocyanato groups in the polyurethane product. When the polyurethanes are employed in applications where surface characteristics are important, the gel particles mar these characteristics. It has now been found that the formation of gel particles in the thermoplastic polyurethanes can be greatly reduced by employing high molecular weight monofunctional compounds having a primary or secondary hydroxyl group in the reaction mixture of the organic compound and having functional groups reactive with isocyanato groups on the organic polyisocyanate. Although theoretically, the molecular weight of a linear polyurethane may be controlled by adjusting stoichiometry so as to terminate the polymer in hydroxyl groups, from a practical standpoint, precise control of stoichiometry and reaction is often not achievable with the result that terminal isocyanato groups survive on some polymer chains in the product. These reactive end groups may undesirably further chain extend and cross-link in storage and during processing. The monofunctional alcohol acts as a chain terminator and hence the capacity for further chain extension or cross-linking via end group reactivity is reduced. Thus, replacing a portion of reactive polymer end groups with inert chain terminator reduces the probability of gel formation and increases the tolerance of the system to errors in the hydroxyl to isocyanato stoichiometry. The rate at which the high molecular weight monofunctional alcohol enters into the reaction can be controlled by utilizing secondary or hindered alcohols which react more slowly than primary hydroxyl groups. The use of such slower reacting monoalcohols minimizes the possibility of forming undesirable low molecular weight adducts with the diisocyanate. Another benefit is the modification of polymer properties, such as flexibility, through internal plasticization via terminal polymer segments.

It is the object of this invention to provide a process whereby the formation of gel particles in polyurethanes is greatly reduced. It is also the object of this invention to provide a process wherein the surface characteristics of polyurethanes are not adversely effected. A further object is to provide a process wherein the degree of control over stoichiometric amounts of the reactants need not be as exact as heretofore. These and other objects will become apparent to one skilled in the art from the following detailed description.

SUMMARY OF THE INVENTION

This invention relates to a process for the reduction of gel particles in polyurethanes. More particularly, this invention relates to a process wherein the formation of gel particles in polyurethanes is greatly reduced by employing a high molecular weight compound having a primary or secondary hydroxyl group in the reaction mixture of the organic compound containing groups reactive with isocyanato groups and an organic polyisocyanate, and to the products thus produced.

DESCRIPTION OF THE PREFERRED EMBODIMENTS

Suitable organic compounds having functional groups reactive with isocyanato groups which can be employed in the preparation of thermoplastic polyurethane plastics include, for example, diols, dihydroxyl polyesters, polyester amides, dihydric polyalkylene ethers, dihydric polythioethers, and the like. Typical examples of dihydric alcohols include ethylene glycol; diethylene glycol; triethylene glycol; tetraethylene glycol; propylene glycol; dipropylene glycol; 2-methyl-2-ethyl-1,3-propanediol; 2-ethyl-1,3-hexanediol; 1,6-hexanediol; 1,5-pentanediol; 1,4-butanediol; neopentyl glycol; 1,2-dimethyl-1,2-cyclopentanediol; like compounds apparent to those skilled in the art; and mixtures thereof. The glycols generally contain two to about 10 carbon atoms.

Any suitable dihydroxyl-containing polyester diol may be used such as, for example, the reaction product of a dicarboxylic acid and a dihydric alcohol such as described hereinbefore. Suitable carboxylic compounds can be either an acid, acid anhydride, acid halide or mixtures thereof; can be aliphatic, cycloaliphatic, aromatic, or heterocyclic; and can be either saturated or unsaturated. Among the compounds which can be employed are the respective acids, anhydrides and halides of adipic, succinic, glutaric, malonic, maleic, fumaric, phthalic, isophthalic, terephthalic, tetrachlorophthalic, chlorendic, and the like. The hydroxyl-containing polyesters have a substantially linear configuration and a functionality of about two.

Dihydric polyalkylene ethers can be used such as the condensation product of an alkylene oxide with a small amount of a compound containing active hydrogen-containing groups such as, for example, water, ethylene glycol, propylene glycol, butylene glycol, amylene glycol, and the like. Alkylene oxides used in the condensates include ethylene oxide, propylene oxide, butylene oxide, styrene oxide, and mixtures thereof. The polyalkylene ethers prepared from tetrahydrofuran can also be used. Polyhydric polythioethers can be used in the instant invention such as the reaction product of one of the aforementioned alkylene oxides used in the preparation of the polyhydric polyalkylene ethers with a polyhydric thioether such as thiodiglycol, 2,3'-dihydroxyl propyl sulfide, 4,4'-dihydroxy butyl sulfide, 1,4-(B-hydroxyl ethyl) phenylene dithioether, and the like.

The organic compound containing groups reactive with isocyanato groups can also be a polyester amide produced by the reaction of an amine and/or amino alcohol with a polycarboxylic acid. Typical amines include ethylene diamine, propylene diamine, and the like. Suitable amino alcohols include B-hydroxyl ethyl amine, and the like. The polycarboxylic compounds have been described hereinbefore. Further, a mixture of a glycol and an amino alcohol or polyamine can be employed. Any of the glycols described hereinbefore are suitable.

In general, the organic compounds having functional groups reactive with isocyanato groups will have a molecular weight of about 60 to 5,000, preferably about 800 to about 3,000.

The organic compounds containing active hydrogen atoms which are reactive with isocyanato groups are reacted with any organic diisocyanate. Suitable diisocyanates include the toluene diisocyanates, particularly 2,4-toluene diisocyanate; 2,6-toluene diisocyanate; and mixtures of the two isomers, especially mixtures of 80 percent of the 2,4-isomer and 20 percent of the 2,6-isomer. Crude mixtures which are commercially available are also useful. Other suitable diisocyanates include methylene bis(4-phenyl isocyanate); methylene bis(4-cyclohexyl isocyanate); hexamethylene diisocyanate; 1,5-naphthalene diisocyanate; 1,3-cyclopentylene diisocyanate; dimer acid diisocyanate; p-phenylene diisocyanate; as well as crude commercial mixtures of such organic diisocyanates. In preparing the thermoplastic polyurethane composition of this invention, a mixture of the organic compounds and organic diisocyanate are preferably reacted in a ratio sufficient to produce about 90 to about 110 percent isocyanate groups with respect to the total number of groups reactive with the isocyanato groups and preferably in a stoichiometric ratio.

The formation of gel particles in the polyurethane compositions is greatly reduced by employing a high molecular weight monofunctional compound having a primary or preferably a secondary hydroxyl group. The secondary hydroxyl group of the additive compound is slow to react with the isocyanato groups and, therefore, does not hinder the desired reaction of the organic compound with the organic polyisocyanate. Towards the end of the desired reaction, the additive reacts with the free, unreacted isocyanato groups to eliminate them from the product and prevent their subsequent reaction with atmospheric moisture or other chain extending and cross-linking reactions. The additive can be a long-chain alcohol or a mono-ester containing a single hydroxyl group. The additive should have sufficiently high molecular weight so that it does not evaporate during the reaction of the organic compound with the diisocyanate at elevated temperature. The molecular weight is generally about 130 to about 350, preferably about 200 to about 300, and the additive generally contains eight to 22 carbon atoms, preferably 12 to 20 carbon atoms. Typical long-chain alcohols which can be employed in this invention include octanol, sec-octanol, sec-nonanol, sec-decanol, sec-dodecanol, sec-tetradecyl alcohol, cetyl alcohol, sec-cetyl alcohol, stearyl alcohol, sec-stearyl alcohol, and the like. The gel-reducing agent can also be a saturated mono-ester containing a hydroxyl group such as the ester of an aliphatic carboxylic acid of two to about 18 carbon atoms, e.g., butyric acid, caproic acid, stearic acid, formic acid, and the like, with a hydroxyl-containing glycol compound, e.g., propylene glycol, 1,2-butanediol, 1,3-butanediol, pentanediol, and the like compounds having two to about 10 carbon atoms, such as disclosed hereinbefore.

The high molecular weight compound is added to the reaction mixture in an effective gel reducing amount of about 0.25 to about 5 weight percent based on the total weight of the mixture and preferably about 1.0 to about 3.0 weight percent. The mixture of active hydrogen-containing compound, organic diisocyanate, and gel reducing agent can be reacted by any of the processes known in the art. Generally, a reaction temperature of about 80° C. to about 225° C., preferably about 100° C. to about 200° C., is employed. The reaction time can vary considerably, but is generally about 5 minutes to about 10 hours, usually about 10 minutes to about 6 hours. The resulting thermoplastic polyurethane products can be employed in applications such as the preparation of films, sheets, tubing and coatings, either alone or in combination with other plastics such as polyvinylchloride, and the like.

The following examples will serve to illustrate the present invention but are not intended to limit it. In this specification and claims, all parts are by weight and all temperatures in degrees centigrade unless indicated otherwise.

EXAMPLE 1 — CONTROL

Two-hundred grams of a blend composed of polyester and 1,4 butanediol were prepared. The polyester is a linear, hydroxyl terminated compound derived from the esterification of 1,6 hexanediol with a mixture of adipic and isophthalic acids in a mole ratio of 7:3. The hexanediol is present in sufficient excess during the esterification so as to insure polyester termination in hydroxyl groups. The polyester had a molecular weight of 1,500. The polyester-butanediol blend consists of 14.65 parts of polyester to 1 part of butanediol. This blend was mixed with 70.1 grams of 4,4'-diphenylmethane diisocyanate at a temperature of 100° C. and cast into a tray coated with mold release. The casting was cured at 120° C. for 6 hours. At the end of this period, the polymer was removed from the tray and tested for mechanical and physical properties with the following results:

| | |
|---|---|
| 100% Modulus PSI | 600 |
| 200% Modulus PSI | 900 |
| 300% Modulus PSI | 1500 |
| 400% Modulus PSI | 3900 |
| Tensile Strength PSI | 6000 |
| Elongation % | 500 |
| Graves Tear PLI | 320 |
| Melt Index* | 2 gms/10 min. |
| Hardness Shore A | 75 |

* 163° C., 2,160 gm weight

The cured polymer was also tested for gel content in the following way:

One-hundred grams of polymer was placed on a heated two roll mill and plasticated to form a continuous sheet. One percent of a lubricant was incorporated to permit removal of the sheet and 0.3 percent of a black finely pulverized pigment was added in order to establish a transparency contrast between the pigmented matrix and infusible or partially fused polymer particles which do not accept pigmentation. The temperature of the mill rolls was 150° C. and the stock temperature was 155° C. A 12 mil sheet was removed after 10 minutes processing on the mill. This was carefully inspected for unpigmented spots with transmitted high intensity illumination and numerous gels appeared as tiny star-like windows in the sheet. An approximate count of these gels amounted to five per 100 square inches. This gel content not only adversely affects appearance of a film, but causes weak spots which permit tearing of the film during subsequent processing of the film.

EXAMPLE 2

Two-hundred grams of the linear hydroxyl terminated polyol-polyester blend of Example 1 was mixed with 72.4 grams of 4,4'-diphenylmethane diisocyanate and 4.0 grams of the monoisobutyrate ester of 2,2,4 trimethyl pentanediol, a secondary alcohol ester having a theoretical molecular weight of 216 were mixed at 100° C. and allowed to cure for 6 hours in a forced-draft oven at 120° C. The cured polyurethane was cooled and it was observed that the gel content, as determined by the gel test in Example 1, was negligible. Physical and mechanical properties are as follows:

| | |
|---|---|
| 100% Modulus PSI | 550 |
| 200% Modulus PSI | 800 |
| 300% Modulus PSI | 1350 |
| 400% Modulus PSI | 3800 |
| Tensile Strength PSI | 5800 |
| Elongation % | 550 |
| Graves Tear PLI | 300 |
| Melt Index* | 3 gms/10 min. |
| Hardness Shore A | 70 |

* 163° C., 2160 gm weight

EXAMPLES 3–6

The procedure of Example 2 is repeated with a linear, hydroxyl terminated polyester of 1,4-butanediol and adipic acid having a molecular weight of 1,500. 14.65 parts of polyester are blended with 1 part of butanediol. Following the procedure of Example 2, 200 grams of the blend are reacted with 72.4 grams of 4,4'-diphenylmethane diisocyanate and 4 grams of each of the following compounds in the respective Examples 3–6: cetyl alcohol, sec-stearyl alcohol, monocapylate ester of propylene glycol and the monoformate ester of pentanediol. Cured thermoplastic polyurethane films having negligible gel content are produced. Similar results are obtained when other active hydrogen containing compounds and other diisocyanates are employed.

Various changes and modifications can be made in the process and products of this invention without departing from the spirit and scope of the invention. The various embodiments of the invention disclosed herein serve to further illustrate the invention but are not intended to limit it.

We claim:

1. A thermoplastic polyurethane composition which is the bulk polymerized product of components comprising (1) an organic diisocyanate, (2) an organic compound having two functional groups reactive with isocyanato groups selected from the group consisting of at least one of dihydric alcohols, dihydroxy polyesters, polyester amides, dihydric polyalkylene ethers, and dihydric polythioethers, and (3) about 0.25 to about 5 weight percent based upon the total weight of the composition of a saturated mono-ester of an aliphatic carboxylic acid of two to about 18 carbon atoms with a glycol having 2 to about 10 carbon atoms, said saturated mono-ester having a primary or secondary hydroxyl group and eight to 22 carbon atoms.

2. The composition of claim 1 wherein said saturated mono-ester has a molecular weight of about 130 to about 350.

3. The composition of claim 2 wherein said saturated mono-ester is the mono-isobutyrate ester of 2,2,4-trimethylpentanediol.

4. A method of reducing gel content in bulk polymerized thermoplastic polyurethanes which comprises reacting a mixture comprising (1) an organic diisocyanate and (2) an organic compound having two functional groups reactive with isocyanato groups selected from the group consisting of at least one of dihydric alcohols, dihydroxy polyesters, polyester amides, dihydric polyalkylene ethers, and dihydric polythioethers, in the presence of an effective gel particle reducing amount of a saturated mono-ester of an aliphatic carboxylic acid of two to about 18 carbon atoms with a glycol having 2 to about 10 carbon atoms, said saturated mono-ester containing a primary or secondary hydroxyl group and eight to 22 carbon atoms.

5. The method of claim 5 wherein said saturated mono-ester has a molecular weight of about 130 to about 350.

6. The method of claim 5 wherein said saturated mono-ester comprises about 0.25 to about 5 weight percent of the total weight of the mixture.

7. The method of claim 4 wherein said saturated mono-ester has a molecular weight of about 200 to about 300 and comprises about 1.0 to about 3.0 weight percent of on the total weight of the mixture.

8. The method of claim 7 wherein said saturated mono-ester is the mono-isobutyrate ester of 2,2,4-trimethylpentanediol.

9. The composition of claim 2 wherein said saturated mono-ester has a molecular weight of about 200 to about 300 and is present in the proportion of 1 to about 3 weight percent based upon the weight of the composition, wherein said carboxylic acid is selected from the group consisting of butyric acid, caproic acid, and formic acid, and wherein said hydroxyl-containing compound is selected from the group consisting of propylene glycol, 1,2-butanediol, 1,3-butanediol, and pentanediol.

* * * * *

PO-1050
(5/69)

UNITED STATES PATENT OFFICE
CERTIFICATE OF CORRECTION

Patent No. 3,718,622            Dated February 27, 1973

Inventor(s)     Louis T. Camilleri et al.

It is certified that error appears in the above-identified patent and that said Letters Patent are hereby corrected as shown below:

Column 3, line 13, after "diisocyanate;" insert --and--; lines 14 and 15, delete "; as well as crude commercial mixtures of such organic diisocyanates". Column 6, line 29, "claim 5" should read --claim 4-- .

Signed and sealed this 17th day of September 1974.

(SEAL)
Attest:

McCOY M. GIBSON JR.            C. MARSHALL DANN
Attesting Officer            Commissioner of Patents